(12) United States Patent
Purdey et al.

(10) Patent No.: US 8,353,158 B2
(45) Date of Patent: Jan. 15, 2013

(54) TURBOCHARGER BEARING ASSEMBLY AND LUBRICATION THEREOF

(75) Inventors: Matthew J Purdey, Huddersfield (GB); Mohammed Hanif Khan, Birmingham (GB)

(73) Assignee: Cummins Turbo Technologies Limited, Huddersfield (GB)

(*) Notice: Subject to any disclaimer, the term of this patent is extended or adjusted under 35 U.S.C. 154(b) by 336 days.

(21) Appl. No.: 12/697,678

(22) Filed: Feb. 1, 2010

(65) Prior Publication Data

US 2010/0132358 A1 Jun. 3, 2010

Related U.S. Application Data

(63) Continuation of application No. PCT/GB2008/002586, filed on Jul. 30, 2008.

(30) Foreign Application Priority Data

Aug. 1, 2007 (GB) .................................. 0714929.7

(51) Int. Cl.
*F02B 33/44* (2006.01)
*F01D 25/16* (2006.01)
*F01D 25/18* (2006.01)

(52) U.S. Cl. ...................... 60/605.3; 415/110

(58) Field of Classification Search .............. 60/605.3; 417/407; 415/110
See application file for complete search history.

(56) References Cited

U.S. PATENT DOCUMENTS

| | | | |
|---|---|---|---|
| 3,411,706 A | 11/1968 | Woollenweber, Jr. et al. | |
| 3,728,857 A * | 4/1973 | Nichols | 417/407 |
| 3,890,780 A * | 6/1975 | Hagemeister et al. | 417/407 |
| 4,541,784 A * | 9/1985 | Horler | 417/407 |
| 4,624,629 A | 11/1986 | Murayama et al. | |
| 4,927,336 A * | 5/1990 | Rossmann et al. | 417/407 |
| 5,193,989 A * | 3/1993 | Fleury et al. | 417/407 |
| 5,308,169 A | 5/1994 | Baker et al. | |
| 5,735,676 A * | 4/1998 | Loos | 417/407 |
| 5,924,286 A | 7/1999 | Kapich | |

FOREIGN PATENT DOCUMENTS

| | | |
|---|---|---|
| GB | 1 436 347 | 5/1976 |
| KR | 2001-0056316 | * 7/2001 |
| KR | 20010056316 | 7/2001 |
| WO | WO 2006/095361 | 9/2006 |

OTHER PUBLICATIONS

International Search Report, PCT/GB2008/002586, Nov. 12, 2008, Cummins Turbo Technologies Limited.
Search Report, GB0714929.7, Nov. 8, 2007, Cummins Turbo Technologies Limited.

* cited by examiner

*Primary Examiner* — Mary A Davis
(74) *Attorney, Agent, or Firm* — Krieg DeVault LLP (57) ABSTRACT

A turbocharger bearing housing defines a bore in which the turbocharger shaft is mounted for rotation in journal bearings. Lubricating oil is delivered to the journal bearings and a residue is retained in reservoirs in which the journal bearings are located. Two fluid retaining members are disposed around the shaft, each forming a wall of the reservoir and being sealed to the bearing housing. The lubricating fluid reservoir is provided between the fluid retaining members to a depth that at least partially immerses the journal bearings even when the oil supply is interrupted. This ensures that there is sufficient oil to lubricate the bearings at engine start-up, thereby reducing the risk of wear.

21 Claims, 4 Drawing Sheets

TURBOCHARGER BEARING ASSEMBLY AND LUBRICATION THEREOF

CROSS REFERENCE TO RELATED APPLICATIONS

The present application is a continuation of PCT/GB20081002586 filed Jul. 30, 2008, which claims priority to United Kingdom Patent Application No. 07149297 filed Aug. 1, 2007, each of which are incorporated herein by reference.

The present invention relates to a bearing assembly of a turbocharger for an internal combustion engine and, in particular, to the lubrication of the same.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported for rotation by journal bearings in a bore in a central bearing housing connected between the turbine and compressor wheel housing. In automotive heavy duty diesel engine applications these are generally in the form of a pair of fully floating bearings or rolling element bearings that are retained in position relative to the shaft by circlips or the like. Axial forces imparted to the shaft by the compressor or turbine are resisted by an axial thrust bearing that is typically in the form of a thin disc disposed around the shaft and supported on one side by a thrust collar and on the other by the bearing housing and/or other components. The thrust bearing has a central bore for receiving a thrust collar that is mounted on the shaft for rotation therewith immediately adjacent a radial step defined thereon.

The turbocharger shaft and bearing assembly rotate at very high speeds and effective lubrication is imperative to avoid premature failure through wear or seizure. Lubricating oil is supplied to the bearing assembly from the engine oil system via an oil inlet in the bearing housing. Oil is distributed via galleries and passages in the bearing housing to circumferential holes in the outer races of journal bearings. When the engine is in operation the oil is supplied under pressure to the rotating bearing assemblies and the oil penetrates through the circumferential holes to an interface between the inner part of the bearings and the shaft. Similarly, the oil is supplied from the galleries and passages to the periphery of the thrust bearing from where is penetrates through a radially extending passage in the disc to the interface between it and the thrust collar. The oil drains from the bearing assembly bore between the thrust bearing and collar and at the end of the bearing housing bore adjacent to the turbine housing.

When the internal combustion engine is started there is a delay before the oil arrives at the bearing assembly. This delay can be increased during cold conditions as the oil has a higher viscosity than when the engine has been running for some time. The lack of lubricating oil at the bearing surfaces during this delay can result in excessive wear even in the relatively short period concerned.

It is important to provide an effective sealing arrangement at each end of the rotating shaft to prevent oil leakage from the central bearing housing into the compressor or turbine housing during use and to prevent leakage of the high gas pressures from the compressor and turbine housings into the bearing housing. This is typically provided by one or more ring seals (often known as "piston" ring seals) disposed between the shaft and the bearing housing at each end. The seals are typically disposed in respective grooves in the shaft and are each arranged with radial and axial clearances relative to the respective groove wall so as to allow the passage of gas in small volumes across the seals but to choke the flow so to accommodate the pressure differential between the relatively high pressure regions in the compressor and turbine housings and the relatively low pressure area in the bearing housing. The seals are designed to limit the flow of gas between the bearing housing and the compressor and turbine housings. At the same time the pressure difference across these end seals also serves to restrict the possibility of oil leakage out of the bearing housing into the compressor or turbine housings. When the turbocharger shaft is not rotating, for example, when the engine is switched off, the pressure differential across the seal is negligible and oil that is already present in the region of the seal can leak past the end seals through the axial and radial clearances. This is particularly so if the turbocharger is tilted with respect to the horizontal (which it might be, for example, if the vehicle is parked on an incline).

It is an object of the present invention, amongst others, to provide for a turbocharger bearing assembly with an improved lubrication supply.

According to a first aspect of the present invention there is provided a turbocharger comprising: a turbocharger shaft for rotation about an axis and for supporting a compressor wheel at first end and a turbine wheel at a second end; a bearing housing having a wall defining a bore in which the shaft is received with a substantially annular clearance, the shaft being supported for rotation in the bore by at least one journal bearing housed within the annular clearance; a first gas seal between the shaft and the bearing housing proximate the first end of the shaft; a second gas seal between the shaft and the bearing housing proximate the second end of the shaft; at least one fluid passage for delivering lubricating fluid from a fluid source to the at least one journal bearing; at least two fluid retaining members disposed around the shaft and each having an outer portion that is sealed to the wall that defines the bore; and the at least one journal bearing being disposed at an axial position between fluid retaining members so that, in use, a volume of lubricating fluid is retained in at least one lubricating fluid reservoir defined between the fluid retaining members and the wall to a depth that at least partially immerses the journal bearing when the turbocharger shaft is not rotating The arrangement ensures that there is at least one reservoir of lubricating fluid for each journal bearing after the fluid supply has been interrupted for some time as a result of an internal combustion engine to which the turbocharger may be connected not being used. Thus even when the internal combustion engine is started after an extended period of it being switched off, the lubricating fluid reservoir maintains lubrication of the journal bearing(s) during and after the start-up process until fresh fluid is delivered from the engine. In this context reference to "in use" refers to the turbocharger being supplied with lubricating fluid but not specifically to the instance where the shaft is rotating during operation of the turbocharger. In practice during operation of the turbocharger the volume of fluid in the reservoir may well vary in view of the turbulent conditions.

There may be provided at least one fluid drain in the bearing housing for draining lubricating fluid away from the bore. This may be provided in the wall. The at least one drain may be disposed outside the at least one lubricating reservoir. The at least one drain may comprise a drain that is disposed axially outboard of the at least two fluid retaining members. A radial clearance between the oil retaining members and the shaft may allow lubricating fluid to flow out of the at least one lubricating fluid reservoir to the at least one drain. The wall may have an opening that is disposed so as to allow excess lubricant to egress the reservoir by overflowing the wall and passing through the opening.

The wall may extend substantially axially between the at least two fluid retaining members.

The fluid retaining members may be disposed between the second seal and the compressor wheel and may be axially spaced from the second seal. The first seal may comprise a sealing ring or a plurality of axially spaced sealing rings. The second seal may comprise a sealing ring or a plurality of axially spaced sealing rings.

At least one of the fluid retaining members may be integral with the first seal. The fluid retaining members may be disposed between the first and the second seals.

The fluid retaining members need not extend all the way around the shaft as fluid may be retained to a sufficient depth by members that extend only part-way around the shaft.

The fluid retaining members are preferably fixed relative to the bearing housing.

At least one of the fluid retaining members may be substantially annular or partially annular. There may be more than one journal bearing provided along the length of the shaft and the fluid retaining members may be configured to provide a single reservoir for both journal bearings or separate reservoirs. There may be provided a third fluid retaining member disposed between the first and second journal bearings so as to provide first and second reservoirs, one for each journal bearing. A first reservoir is defined between first and third fluid retaining members and a second reservoir is defined between second and third fluid retaining members.

A first of the fluid retaining members may be provided by an axial thrust bearing acting between the shaft and a thrust face of the bearing housing so as to resist axial thrust forces of the shaft. The axial thrust bearing may comprise a sealing element disposed in an interface between a surface of the bearing and the thrust face of the bearing housing. A thrust collar fixed relative to the shaft may be provided, the thrust bearing being positioned to bear against the collar. The thrust face may have a fluid relief passage offset by a predetermined distance from the shaft axis, whereby fluid above a certain level in the reservoir is able to egress via the relief passage. The fluid relief passage may take any convenient form.

At least one of the fluid retaining members may be integrally formed with the bearing housing and it may be in the form of a substantially annular rib integrally formed with the bearing housing and extending towards the shaft. Two such retaining members may be provided, each to one side of a respective journal bearing.

At least one of the fluid retaining members may be seated in a groove defined in the bearing housing. The outer portion of such a fluid retaining member may be resiliently flexible such that it expands or deforms radially into said groove.

The outer portion of at least one of the fluid retaining members comprises an elastomeric element for sealing against a surface of the bearing housing and may further comprise a circlip bonded to the elastomeric member. Alternatively, it may further comprise a body with an outer surface for supporting the elastomeric element.

At least one of the fluid retaining members may comprise an annular body with a central aperture in which said shaft is received, the body having a substantially radially extending portion and a substantially axially extending portion that forms said outer portion, an outer surface of the axially extending portion being arranged to seal against a surface of the bearing housing.

At least one of the fluid retaining members may be disposed immediately adjacent to the at least one journal bearing so as to retain the bearing in an axial direction.

The at least one lubricating fluid reservoir may be substantially in the form of a partial cylinder arranged around the shaft.

There may be provided a turbine wheel at one end of a shaft for rotation therewith and/or a compressor wheel mounted to the other end of the shaft for rotation about said axis.

The thrust bearing may have an oil passage therethrough and may communicate with an oil supply passage in the bearing housing.

The thrust bearing assembly may comprise inner and outer concentric members, said inner member being fixed to the shaft for rotation therewith and said outer member being fixed to the bearing housing. The outer member may have an oil passage therethrough for delivering oil from a supply passage in the housing to the annular clearance between the inner and outer members of the thrust assembly. The oil passage in the outer member may have a side port for communication with said oil supply passage in the bearing housing.

The inner member of the thrust bearing assembly may be a bush having a radially outward extending flange that abuts said outer member.

The shaft may be stepped and the inner member may abut said step.

The lubricating fluid may be engine oil.

According to a second aspect of the present invention there is provided a turbocharger as defined above in combination with an internal combustion engine, an exhaust gas path from the internal combustion engine for directing exhaust gas to the turbine, an air inlet path for directing air from the compressor wheel to an inlet manifold of the internal combustion engine, the internal combustion engine having a lubricating fluid reservoir that is in fluid communication the at least one fluid passage, wherein the at least one lubricating fluid reservoir is retained between the fluid retaining members to a depth that at least partially immerses the journal bearing when no exhaust gas flows from the engine to the turbine.

In this condition the engine may be stopped.

Specific embodiments of the present invention will now be described, by way of example only, with reference to the accompanying drawings, in which.

Figure 1:
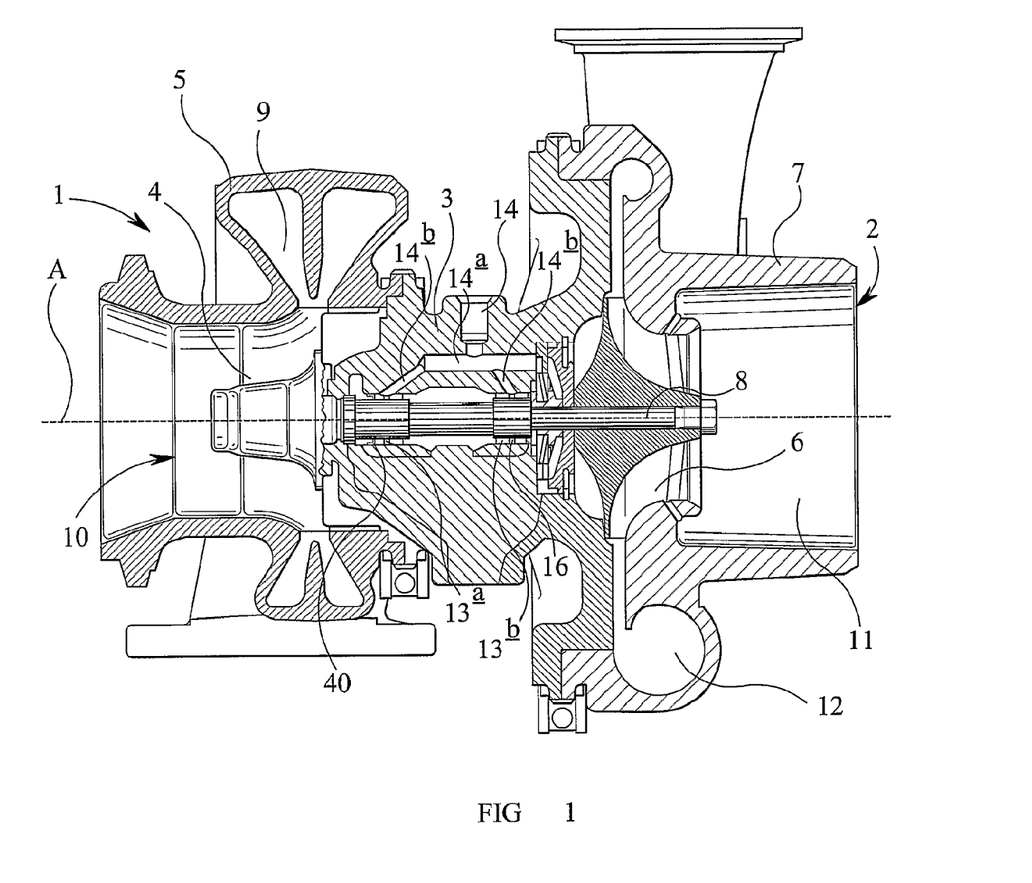
FIG. 1 is an axial cross-section through an embodiment of the turbocharger in accordance with the present invention.

Referring to FIG. 1, the illustrated turbocharger comprises a turbine 1 joined to a compressor 2 via a central bearing housing 3. The turbine 1 comprises a turbine wheel 4 rotating within a turbine housing 5. Similarly, the compressor 2 comprises a compressor wheel 6 that rotates within a compressor housing 7. The turbine wheel 4 and compressor wheel 6 are mounted on opposite ends of a common turbocharger shaft 8 that extends through the central bearing housing 3.

In use, the turbine wheel 4 is rotated by the passage of exhaust gas passing over it from an inlet 9, which is connected to the outlet manifold of the internal combustion engine, to an outlet 10. This in turn rotates the compressor wheel 6 that draws intake air through a compressor inlet 11 and delivers boost air to the inlet manifold of an internal combustion engine via an outlet volute 12.

The turbocharger shaft 8 rotates on fully floating journal bearings 13a and 13b housed towards the turbine end and compressor end respectively of the bearing housing 3. Oil is fed to the bearings under pressure from the oil system of the engine via an oil inlet 14, gallery 14a and passages 14b. Each journal bearing 13a, 13b is retained in place by circlips (not shown in FIG. 1) and is provided with circumferentially spaced radial holes 16 for oil to pass to the turbocharger shaft 8. The oil drains out of the bearings 13a, 13b and returns to the engine sump.

End gas seals (not shown in FIG. 1, but shown in FIGS. 2 and 3) S are provided between the shaft 8 and the bearing housing at the compressor and turbine ends of the bearing housing, as is well known. These serve to maintain the pressure differential between the bearing housing and the compressor and turbine housings by preventing significant gas leakage between the two and this restricts the risk of oil leakage out of the bearing housing past the seals S.

Figure 2:
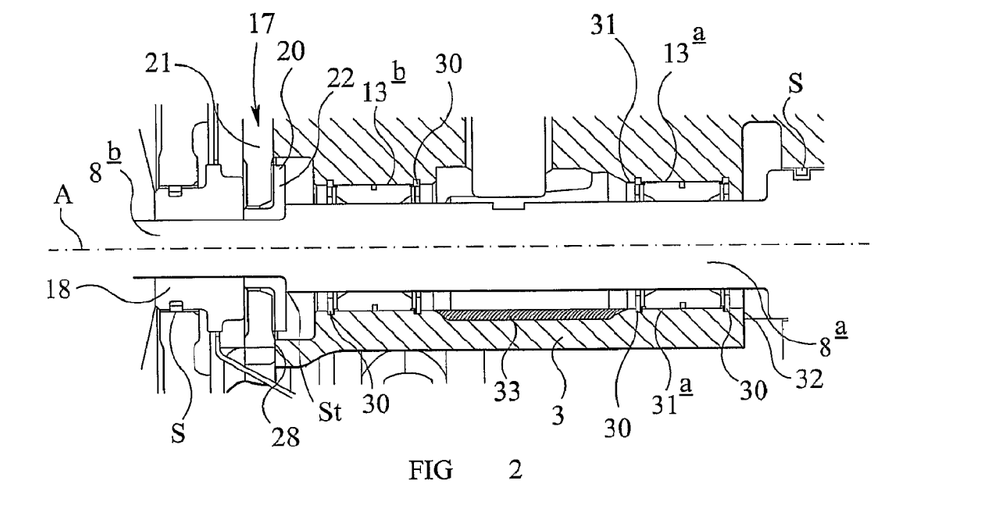
FIG. 2 is an axial sectioned schematic view of part of a bearing housing of a turbocharger, showing the bearing assembly in accordance with the prior art.
Figure 3:
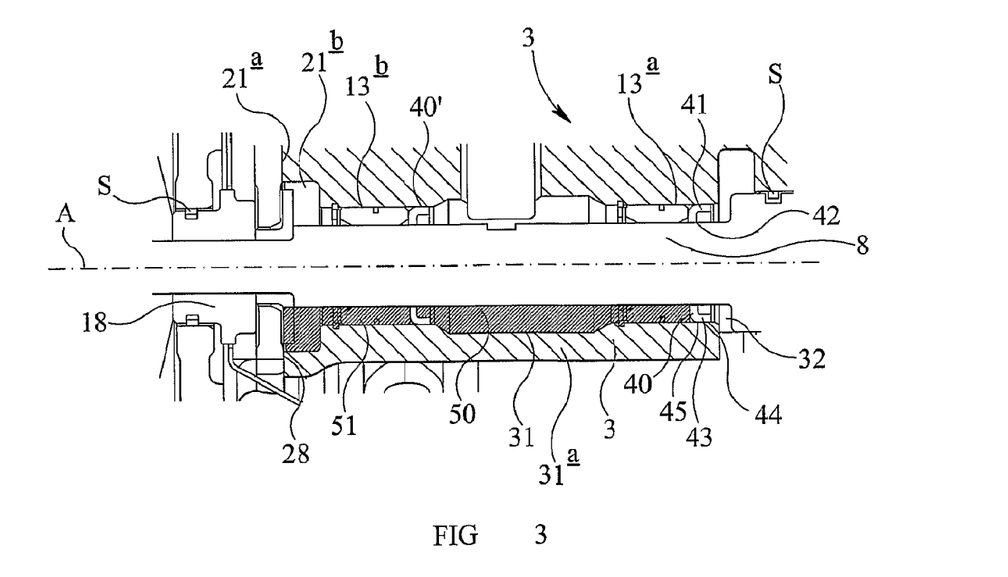
FIG. 3 is an axial sectioned schematic view of part of a bearing housing of a turbocharger in accordance with the present invention.

Referring now to FIGS. 1, 2 and 3 (in FIGS. 2 and 3 the view is reversed with respect to FIG. 1 so that the compressor is to the left and the turbine to the right, although neither are shown), the turbocharger shaft 8 has a rotation axis A (FIGS. 2 and 3 only) and is stepped to form two portions: a first portion 8a of a first diameter that supports the turbine wheel 4 and both journal bearings 13a, 13b; and a second portion 8b of a second diameter, less than said first diameter, that supports a thrust bearing assembly 17 and an oil slinger 18 of conventional configuration. The thrust bearing assembly 17 flanks the journal bearing 13b at the compressor end and comprises a thrust collar 20 in the form of a bush fixed concentrically on the shaft 8 so that it rotates therewith and a radially outboard thrust bearing 21 in the form of a washer that is fixed to the bearing housing 3 such that it does not rotate. The collar 20 abuts against the step $S_t$ between the two portions 8a, 8b of the turbocharger shaft 8 and has a radially outward extending flange 22. The thrust bearing 21 is concentrically disposed over the collar 20, to one side of the flange 22 and is penetrated by an internal radially extending oil passage (hidden). In operation, an axial force acting on the shaft is resisted by the thrust bearing assembly 17 and in particular by the flange 22 of the collar abutting the thrust bearing 21. Oil is delivered into the oil passage through a side port (not shown) in the bearing 21 that interfaces with the gallery 14a in the bearing housing 3. Thus pressurised oil from the bearing housing supply 14, 14a, and 14b is carried through the thrust bearing 21 via its passage so as to lubricate the abutting surfaces of thrust bearing assembly 17.

The oil slinger 18 operates, as is well known, to direct excess oil away from the compressor end seal S.

Figure 6:
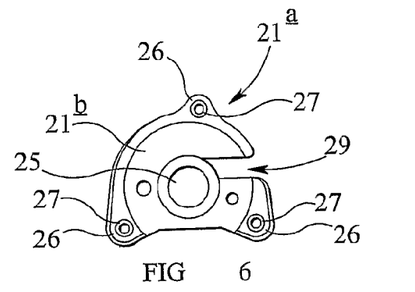
FIG. 6 is a front view of an axial thrust bearing of the turbocharger bearing assembly shown in FIGS. 1 to 5.

The thrust bearing 21 is designed to bear against a substantially radially extending wall portion 21a of the bearing housing which is shown in more detail in FIG. 6. This is a view looking in the direction from left to right in FIG. 3. The wall portion 21a defines a generally annular recess 21b and is penetrated by a central bore 25 for receipt of the shaft 8. Three peripheral lobes 26, outside of the recess 21b, define apertures 27 by which the thrust bearing 21 is fixed to the wall portion 21a of the bearing housing 3 by suitable fixing screws or the like. A lower part of the bearing 21 is designed to seal against the wall portion 21a at a sealing interface indicated at 28 in FIGS. 2 and 3. Above the interface, the side edge of the wall portion 21a at the recess 21a has an opening 29 extending from the periphery towards the central bore 25 at a level above the central axis of the bore. This opening 29 affords the lubricating oil an exit whereby if the level of oil in the bearing housing exceeds this depth it can overflow through the opening 29 and egress to drain. The opening 29 is positioned at a predetermined distance from the central axis of the shaft (and the central aperture of the bearing), the distance affecting the depth of oil retained at that axial location.

FIG. 2 shows a prior art representation of the bearing assembly and the oil lubrication system alongside an embodiment of the present invention in FIG. 3 for ease of comparison. The oil is depicted in the form it has been allowed to settle, as it would between uses of the turbocharger. It will be appreciated that during use the oil will flow with be turbulent around the shaft. In both embodiments the bearings 13a, 13b are retained in place relative to the axis A of the shaft 8 by circlips 30 in a bore 31 defined between the shaft 8 and the housing 3. The bore 31 is defined by a wall 31a and there is a generally annular clearance between external surface of the shaft 8 and the wall 31a in which the bearings 13a, 13b are received. In the prior art embodiment of FIG. 2, two circlips are provided for each bearing whereas in FIG. 3 only one circlip per bearing is shown. When the oil supply is interrupted (e.g. the engine is stopped), in the prior art embodiment of FIG. 2 the oil gradually drains from the bearing area at each end of the shaft 8. At the compressor end it drains between the thrust bearing 21 and collar and then via the interface 28. At the turbine end it drains to the oil pan at the location indicated by reference number 32. This leaves a small residue of oil in a recess in the wall 31 between the bearings as indicated at 33. It will be evident that this oil does not come into contact with the bearings 13a, 13b and does not therefore provide any lubrication on start-up of the engine.

Figure 7:
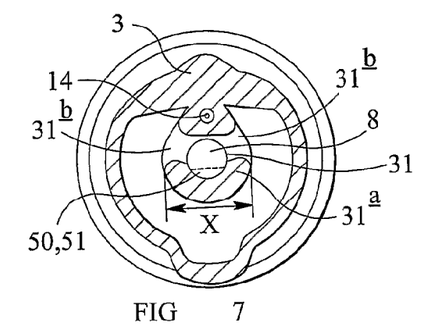
FIG. 7 is a schematic sectioned view taken through a plane orthogonal to the axis of the turbocharger shaft and illustrating an oil bath provided by the arrangement shown in FIGS. 3 to 6 but with several components not shown.

In the embodiment of the present invention of FIG. 3, the shaft 8 is fitted with a pair of annular oil retaining members 40, 40' that serve to retain the oil in the bottom of the annular clearance between the shaft 8 and the wall 31a defining the housing bore 31. In this embodiment, the annular member 40, 40' in each case is a metal ring comprising a body 41 defining a central aperture 42 and a peripheral projection 43 extending in a generally axial direction and pressed into the housing bore 31 such that an outer surface 44 of the projection 43 bears against a surface 45 of the wall 31a in the bearing housing in a sealing relationship. One example of a ring of this type is a "Welch" type plug. The wall surface 45 is the same surface against which an outer surface of the bearings 13a, 13b are respectively supported. The wall 31a extends axially between the bearings 13, 13a and in a region between the retaining members 40, 40', the wall 31a has openings 31b on each side as depicted in FIG. 7. This allows excess lubricating fluid to flow over the sides of the wall to drain. However, the sides of the wall 31a in this area are still designed to maintain the reservoir between the annular members 40, 40' at a depth that immerses the bearings 13a, 13b.

A first of such annular members 40 is disposed between the floating bearing 13a and the turbine wheel (not shown in FIG. 3), immediately adjacent to an axially outer edge of the bearing 13a. In this position it serves not only to retain the lubricating oil in the bore 31 but also to retain the bearing 13a in position. A second annular member 40' is disposed between the first and second floating bearings 13a, 13b so as to maintain a first oil reservoir 50 around the shaft 8 between the two annular members 40, 40' and the wall 31a for the first bearing 13a and a second oil reservoir 51 between it, the thrust bearing assembly 17 and the wall 31a for the second journal bearing 13b. The annular fluid retaining members 40, 40' thus serve as a dam to maintain the first and second oil reservoirs 50, 51 in that they allow oil to accumulate at the bottom of the bore 31 to a level coincident with the sides of wall 31a and/or the edge of the aperture 42 in the body 41 of the annular member 40, 40' (as shown in FIG. 3) from where it can seep gradually through the clearance between the annular member body 41 and the shaft 8 to drain. However, even when the engine is switched off the reservoirs 50, 51 are maintained to be of a minimum depth that ensures there is sufficient oil present during start-up in order cover at least part of the floating bearings 13a, 13b and the thrust bearing assembly 17 so as to provide lubrication.

Figure 4:
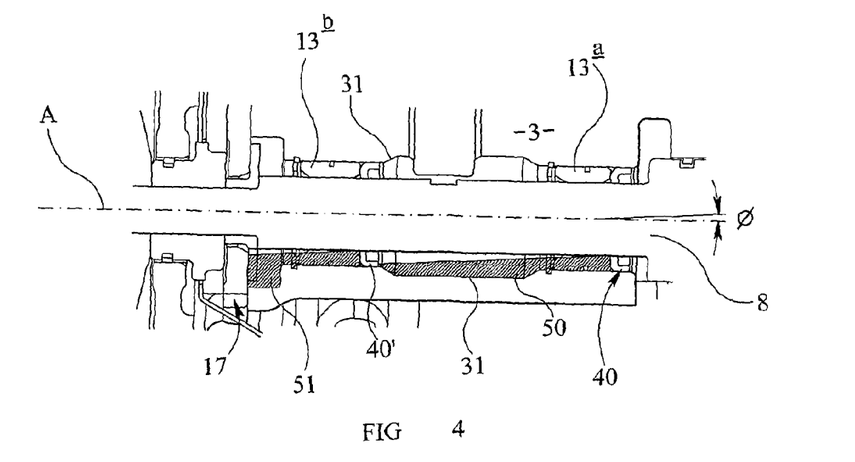
FIG. 4 corresponds to the view of FIG. 3 but with the turbocharger shaft axis inclined in a first direction.
Figure 5:
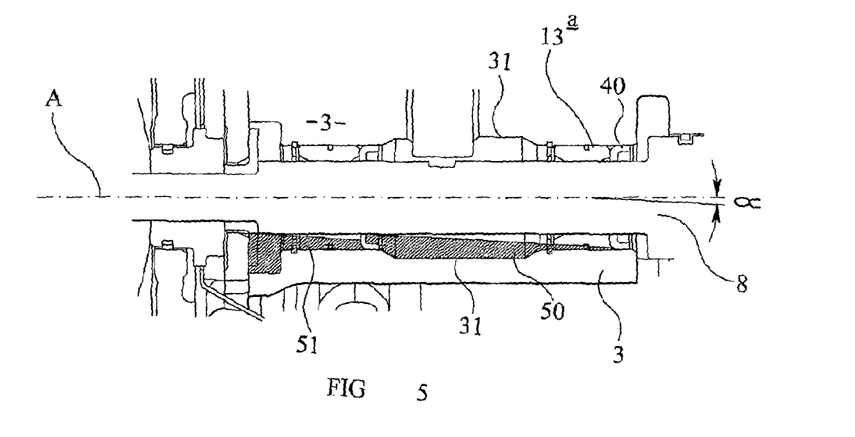
FIG. 5 corresponds to the view of FIG. 4 but with the turbocharger shaft axis inclined in a second direction.

If the turbocharger is intended for operation in a generally horizontal condition only the first annular member 40 axially outboard of the floating bearing 13a is required to maintain a single oil reservoir that extends axially over both journal bearings 13a and 13b to the thrust bearing assembly 17. An example of this is shown in FIG. 1. Alternatively, if the turbocharger is likely to encounter inclination in installation or use then the presence of the two annular members 40, 40' is beneficial as illustrated in FIGS. 4 and 5. In FIG. 4, the turbocharger shaft is inclined to the horizontal at a positive angle denoted by Ø, whereas in FIG. 5 the shaft is inclined by a negative angle denoted by α. It can be seen in these figures that the oil reservoirs 50, 51 are maintained to a sufficient degree even during significant inclination.

The height of the reservoir 50, 51 is initially determined by the height of the sides of the wall 31a and the upper surface of the oil covers the surface of the shaft 8 nearest the bottom of the wall 31a. Over time, when the shaft 8 has not been rotated for some time, some of the oil gradually drains through the clearance between the shaft and the members 40, 40' but the reservoirs 50, 51 are still maintained to immerse the bearings 13a, 13b. The dotted line in FIG. 7 indicates the minimum surface level of the reservoirs. Ideally the retained oil is of sufficient volume that it extends up the side of the bearings 13a, 13b. The wall 31a could be configured to extend the width of the reservoir in the direction represented by double-headed arrow X in FIG. 7.

Figure 8:
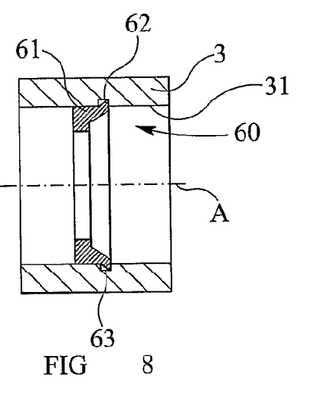
FIG. 8 is a sectioned side view of a first alternative embodiment of an oil retaining member of FIGS. 1 and 3 to 6, in accordance with the present invention.
Figure 9:
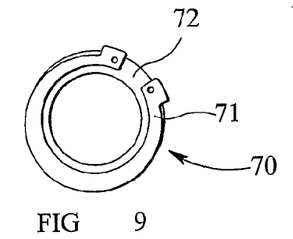
FIG. 9 is a front view of a second alternative embodiment of the oil-retaining member of the present invention.
Figure 10:
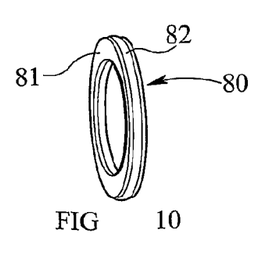
FIG. 10 is a perspective view from one side of a third alternative embodiment of the oil retaining member.

It will be appreciated that the annular fluid retaining members 40, 40' can take many different forms to achieve the desired aim. Examples are shown in FIGS. 8 to 10. In FIG. 8 the annular member 60 differs from that described above in that the axially extending portion 61 is flared outwards at one end (as indicated at 62) and is resilient. In use it can be inserted into the housing bore 31 such that the flared portion 62 is initially radially inwards deformed or deflected whilst it is moved axially along the bore 31 to its intended position whereupon the flared portion 62 can spring radially outwards into an annular groove 63 formed in the bearing housing 3. This helps to locate the annular member 60 in the correct axial position along the shaft 8. In another alternative shown in FIG. 9 the annular member 70 comprises a circlip 71 to which is bonded an elastomeric ring (e.g. rubber) 72. The circlip 71 acts to retain the annular member 70 (and therefore the adjacent bearing 11 or 12) in place whereas the ring 72 provides the seal against the bearing housing 3. In the embodiment of FIG. 10 the annular member 80 is a metal ring 81 having an O-ring seal 82 bonded or otherwise fitted to a peripheral groove or recess in the ring.

Figure 11:
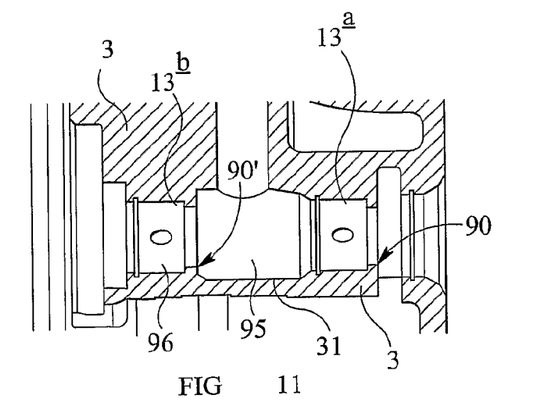
FIG. 11 is an alternative embodiment of the bearing housing and assembly in accordance with the present invention.

FIG. 11 shows an alternative embodiment of the bearing housing whereby the annular members 90, 90' are defined integrally with the bearing housing 3. The housing bore 31 is machined so as to define annular ribs 90, 90' extending radially inwards towards the shaft 8. A first annular rib 90 is provided is defined axially outboard of the first bearing 13a again immediately adjacent thereto and the second annular rib 90' is provided axially in board of the second bearing 13b and is immediately adjacent thereto. In both cases the annular ribs 90, 90' serve as bearing retainers. In operation, a first oil reservoir forms at the bottom of the housing bore 31 in the region denoted by reference number 95 between the ribs 90, 90' and a second reservoir forms at the bottom of the housing bore 31 between the rib 90' and the thrust bearing assembly 17 as denoted by reference number 96 to a level that coincides with the radial inner edge of the rib 90'. In both cases the reservoirs serve to assure a predetermined oil depth for contact with part of the bearings 13a, 13b and which is sufficient to ensure effective lubrication.

In all the above embodiments, the thrust bearing assembly 17 serves as an oil-retaining member by sealing one end of a reservoir. It is to be understood that in other embodiments of the invention, the other designs of annular oil retaining members may be used at one end of the reservoir rather that the thrust bearing. For example an annular oil retaining member of the kind represented at 40,40', 60, 70, 80 or 90, 90' may be used axially outboard of the bearing 13b to maintain reservoir 51, 96 instead of using the thrust bearing for this purpose.

In embodiments where the thrust bearing assembly 17 is used to retain oil it is desirable for the oil not to leak at the interface 28 (FIG. 3) between the thrust bearing 21 and the surface of the housing 3 at the bottom of the bore 31. Various sealing arrangements may be provided to ensure that significant leakage is prevented at pressure up to a certain limit such as, for example, 0.1 bar. Example seals include: an annular or partially annular O-ring seals; a suitably shaped thin gasket seal which may be punched from sheet material (corrugated features may be provided to ensure better sealing); a moulded beaded seal of composite material or otherwise; a machined surface projecting from the thrust face of the housing for embedding into the softer material (e.g. bronze) of the thrust bearing; and metal ring seal of C-shape. Any seal should have good thermal conductivity to assist in the dissipation of heat away from the bearing when oil is not present.

It will be appreciated that the oil dam arrangements described above allow oil to be retained in a reservoir around the bearings between operations of the turbocharger (i.e. between switch off and start-up of the engine) so that there is sufficient oil to lubricate the bearings on start up.

It is to be appreciated that numerous modifications to the above-described embodiments may be made without departing from the scope of the invention as defined in the appended claims. For example, it will be understood that the precise shape and configuration of the components that make up the bearing assembly may vary. Moreover, it is to be understood that the different configurations of annular oil retaining members (including the thrust bearing assembly) may be used in any suitable combination.

The invention claimed is:

1. A turbocharger comprising:
   a turbocharger shaft for rotation about an axis and for supporting a compressor wheel at first end and a turbine wheel at a second end;
   a bearing housing having a wall defining a bore in which the turbocharger shaft is received with a substantially annular clearance, the turbocharger shaft being supported for rotation in the bore by at least two journal bearings housed within the annular clearance;
   a first gas seal between the turbocharger and the bearing housing proximate the first end of the turbocharger shaft;
   a second gas seal between the turbocharger shaft and the bearing housing proximate the second end of the turbocharger shaft;
   at least one fluid passage for delivering lubricating fluid from a fluid source to the at least two journal bearings;
   at least three fluid retaining members, including a first, a second, and a third fluid retaining member, disposed around the turbocharger shaft and each having an outer portion that is sealed to the wall, and each disposed between the first and second gas seals; and
   the at least two journal bearings being disposed at an axial position between the first fluid retaining member and the second fluid retaining member and the third fluid retaining member being disposed between a first journal bearing and second journal bearing of the at least two journal bearings so that, in use when the turbocharger shaft is not rotating, a volume of lubricating fluid is retained in a first lubricating fluid reservoir defined between the first and third fluid retaining members and the wall to a depth that at least partially immerses the first journal bearing, and in a second lubricating fluid reservoir defined between the second and third fluid retaining members and the wall to a depth that at least partially immerses the second journal bearing.

2. A turbocharger according to claim 1, wherein the at least three fluid retaining members are disposed between the second gas seal and the compressor wheel.

3. A turbocharger according to claim 1, wherein at least one of the at least three fluid retaining members is substantially annular.

4. A turbocharger according to claim 1, wherein a first of the at least three fluid retaining members is an axial thrust bearing acting between the turbocharger shaft and the bearing housing so as to resist axial thrust forces of the turbocharger shaft.

5. A turbocharger according to claim 4, wherein the axial thrust bearing comprises a sealing element disposed in an interface between a surface of the axial thrust bearing and a surface of the bearing housing.

6. A turbocharger according to claim 4, wherein the thrust bearing bears against a bearing surface of the bearing housing that has a fluid relief passage offset by a predetermined distance from the turbocharger shaft axis, whereby fluid above a certain level in the reservoir is able to egress via the fluid relief passage.

7. A turbocharger according to claim 6, wherein the fluid relief passage is in the form of an opening in the bearing surface of the bearing housing.

8. A turbocharger according to claim 1, wherein at least one of the three fluid retaining members is integrally formed with the bearing housing.

9. A turbocharger according to claim 8, wherein at least one of the three fluid retaining members is in the form of a substantially annular rib integrally formed with the bearing housing.

10. A turbocharger according to claim 1, wherein at least one of the at least three fluid retaining members is seated in a groove defined in the bearing housing.

11. A turbocharger according to claim 10, wherein the outer portion of the at least three fluid retaining member seated in the groove is resiliently flexible such that it expands or deforms radially into said groove.

12. A turbocharger according to claim 1, wherein the outer portion of at least one of the at least three fluid retaining members comprises an elastomeric element for sealing against a surface of the bearing housing.

13. A turbocharger according to claim 12, wherein the at least one of the at least three fluid retaining members further comprises a circlip bonded to the elastomeric member.

14. A turbocharger according to claim 13, wherein the at least one of the at least three fluid retaining member further comprises an annular member with an outer surface for supporting the elastomeric element.

15. A turbocharger according to claim 1, wherein at least one of the at least three fluid retaining members comprises an annular body with a central aperture in which said turbocharger shaft is received, the body having a substantially radially extending portion and a substantially axially extending portion that forms said outer portion, an outer surface of the axially extending portion being arranged to seal against a surface of the bearing housing.

16. A turbocharger according to claim 1, wherein at least one of the at least three fluid retaining members is disposed immediately adjacent to the at least one journal bearing so as to retain the bearing in an axial direction.

17. A turbocharger according to claim 1, wherein there is provided at least one fluid drain outside of at least one of the first lubricating fluid reservoir and the second lubricating fluid reservoir for allowing lubricating fluid to drain from the bore.

18. A turbocharger comprising:
   a turbocharger shaft for rotation about an axis and for supporting a compressor wheel at first end and a turbine wheel at a second end;
   a bearing housing having a wall defining a bore in which the turbocharger shaft is received with a substantially annular clearance, the turbocharger shaft being supported for rotation in the bore by at least one journal bearing housed within the annular clearance;
   a first gas seal between the turbocharger shaft and the bearing housing proximate the first end of the turbocharger shaft;
   a second gas seal between the turbocharger shaft and the bearing housing proximate the second end of the turbocharger shaft;
   at least one fluid passage for delivering lubricating fluid from a fluid source to the at least one journal bearing;
   at least two fluid retaining members disposed around the turbocharger shaft and each having an outer portion that is sealed to the wall; and
   the at least one journal bearing being disposed at an axial position between the at least two fluid retaining members so that, in use when the turbocharger shaft is not rotating, a volume of lubricating fluid is retained in at least one lubricating fluid reservoir defined between the at least two fluid retaining members and the wall to a depth that at least partially immerses the at least one journal bearing;

wherein:
a first of the at least two fluid retaining members is an axial thrust bearing acting between the turbocharger shaft and the bearing housing so as to resist axial thrust forces of the turbocharger shaft; and
the thrust bearing bears against a bearing surface of the bearing housing that has a fluid relief passage offset by a predetermined distance from the turbocharger shaft axis, whereby fluid above a certain level in the reservoir is able to egress via the fluid relief passage.

19. A turbocharger according to claim 18, wherein the fluid relief passage is in the form of an opening in the bearing surface of the bearing housing.

20. A turbocharger comprising:
a turbocharger shaft for rotation about an axis and for supporting a compressor wheel at first end and a turbine wheel at a second end;
a bearing housing having a wall defining a bore in which the turbocharger shaft is received with a substantially annular clearance, the turbocharger shaft being supported for rotation in the bore by at least one journal bearing housed within the annular clearance;
a first gas seal between the turbocharger shaft and the bearing housing proximate the first end of the turbocharger shaft;
a second gas seal between the turbocharger shaft and the bearing housing proximate the second end of the turbocharger shaft;
at least one fluid passage for delivering lubricating fluid from a fluid source to the at least one journal bearing;
at least two fluid retaining members disposed around the turbocharger shaft and each having an outer portion that is sealed to the wall; and
the at least one journal bearing being disposed at an axial position between the at least two fluid retaining members so that, in use when the turbocharger shaft is not rotating, a volume of lubricating fluid is retained in at least one lubricating fluid reservoir defined between the at least two fluid retaining members and the wall to a depth that at least partially immerses the at least one journal bearing;
wherein:
the outer portion of at least one of the at least two fluid retaining members comprises an elastomeric element for sealing against a surface of the bearing housing; and
the at least one of the at least two fluid retaining members further comprises a circlip bonded to the elastomeric member.

21. A turbocharger according to claim 20, wherein the at least one of the at least two fluid retaining members further comprises an annular member with an outer surface for supporting the elastomeric element.

* * * * *